United States Patent
Steele et al.

(10) Patent No.: US 7,466,855 B2
(45) Date of Patent: Dec. 16, 2008

(54) DISPLAY PROCESSING SYSTEM AND METHOD

(75) Inventors: Jay D. Steele, Fall River (CA); Kenneth J. Whatmough, Georgetown (CA)

(73) Assignee: Research In Motion Limited, Waterloo (CA)

( * ) Notice: Subject to any disclaimer, the term of this patent is extended or adjusted under 35 U.S.C. 154(b) by 1023 days.

(21) Appl. No.: 10/776,824

(22) Filed: Feb. 11, 2004

(65) Prior Publication Data
US 2004/0160456 A1    Aug. 19, 2004

Related U.S. Application Data

(60) Provisional application No. 60/446,207, filed on Feb. 11, 2003.

(51) Int. Cl.
*G06K 9/00* (2006.01)
(52) U.S. Cl. .................... 382/162; 345/612
(58) Field of Classification Search ............... 345/612, 345/591–592, 419, 421, 589, 629; 364/521, 364/518; 340/798, 716, 701, 723; 715/781; 382/162

See application file for complete search history.

(56) References Cited

U.S. PATENT DOCUMENTS 4,982,343 A * 1/1991 Hourvitz et al. ............. 345/592
6,741,261 B2 * 5/2004 Chen ......................... 345/592

OTHER PUBLICATIONS

Smith, A.: "Image Compositing Fundementals," Technical Memo 4, Microsoft Corp., Aug. 15, 1995.
Blinn J.: "Compositing Part 1: Theory," IEEE Computer Graphics and Applications, vol. 15, No. 5, Sep. 1994.
Porter, T. et al., "Compositing Digital Images," Computer Graphics, vol. 18, No. 3, Jul. 1, 1994.

* cited by examiner

*Primary Examiner*—Samir A Ahmed
*Assistant Examiner*—Mehdi Rashidian
(74) *Attorney, Agent, or Firm*—Jones Day; Krishna K. Pathiyal; Robert C. Liang

(57) ABSTRACT

A computer implemented method of processing image pixel data corresponding to an image pixel comprises determining if the image pixel is opaque or transparent. If the image pixel is determined to be opaque, a pixel color value from a first set of image pixel data is determined. If the image pixel is determined to be transparent, a transparency value from a second set of the image pixel data and a pixel color value from a third set of the image pixel data is determined. The second and third sets of the image pixel data are subsets of the first set of image pixel data.

17 Claims, 4 Drawing Sheets

DISPLAY PROCESSING SYSTEM AND METHOD

This application claims the benefit of U.S. Provisional Application Ser. No. 60/446,207, filed Feb. 11, 2003, the entire disclosure of which is incorporated herein by reference.

BACKGROUND

1. Technical Field

This patent document relates to transparency processing and displaying of computer images.

2. Description of the State of the Art

Computer images often use a transparency effect. When part or all of a computer image is transparent, the displayed background can be seen through the transparent portions of the image. Portions of an image can be displayed with varying levels of transparency. For example, when an image portion is 100% transparent, the background of the image is fully visible through the image portion. When an image portion is 0% transparent, the background of the image is not visible through the image portion. And when an image is 50% transparent, some of the background can be seen through the image portion.

To achieve the transparency effect, calculations are performed on the computer data that represent the pixels of the image to determine the correct pixel values of the image as it is to be displayed. The calculations required to achieve transparency often require significant processing and memory resources.

Some media devices may have limited processing and memory resources, and thus systems and methods of displaying transparent images are often not ideal for use on such media devices. The resources required of media devices may be particularly significant when displaying animation, because many potentially transparent images are displayed in rapid succession to create the illusion of smooth movement to the user of the media device.

SUMMARY

A computer implemented method of processing image pixel data corresponding to an image pixel comprises determining if the image pixel is opaque or transparent. If the image pixel is determined to be opaque, then a pixel color value from a first set of image pixel data is determined. If the image pixel is determined to be transparent, however, then a transparency value from a second set of the image pixel data and a pixel color value from a third set of the image pixel data is determined. The second and third sets of the image pixel data are subsets of the first set of image pixel data.

A mobile communication device comprises a display device and a memory module. The display device is operable to display image data. The memory module comprises a source image buffer and a destination image buffer. The source image buffer is operable to store first image data to be displayed on the display device. The destination image buffer is operable to store second image data to be displayed on the display device. The second image data comprises a first data field operable to store opaque data that indicates whether second image data is transparent or opaque, and one or more pixel data fields associated with the first data field. The one or more pixel data fields are operable to store first pixel color data in each pixel data field when the opaque data indicates an image is opaque, and operable to store second pixel color data and transparency data in each pixel field when the opaque data indicates that the image is transparent.

The mobile device may further comprise an imaging module operable to determine if the second image data is opaque or transparent based on the opaque data, to determine a pixel color value from the first pixel color data if the image is determined to be opaque, and to determine the pixel color value from the second pixel color data and to determine a transparency level from the transparency data if the image is determined to be transparent.

DETAILED DESCRIPTION

Figure 1:
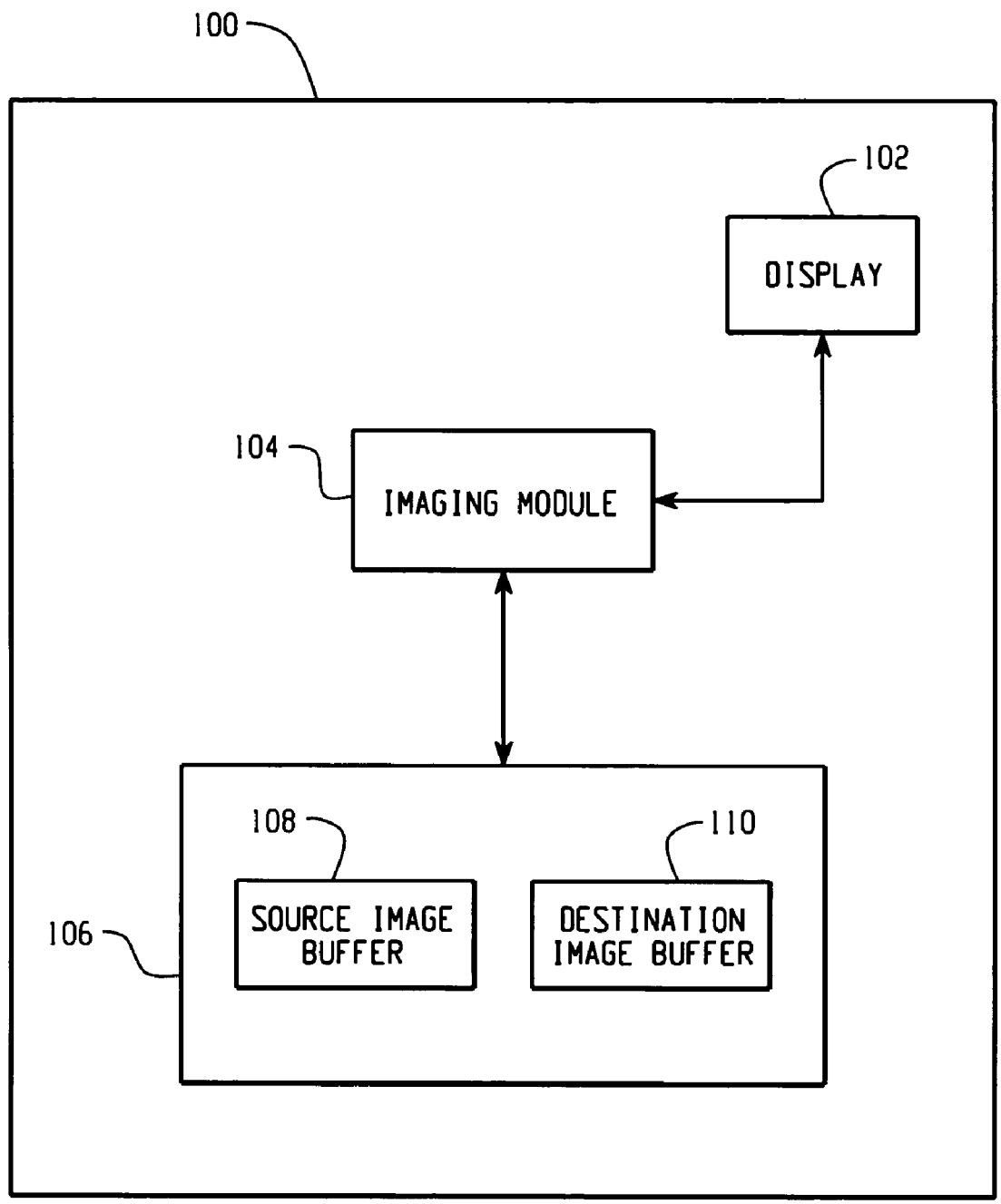
FIG. 1 is a block diagram of a media device.

FIG. 1 is a block diagram of a media device 100 that comprises a display 102, an imaging module 104, and a memory module 106. The display 102 is used to present information including images to the user of the media device 100. For example, the display 102 may be an LCD screen which provides feedback to the user of the media device 100 while the user is interacting with the media device 100.

The imaging module 104 performs processing necessary to display images to a user of the media device 100 via the display 102. The imaging module 104 may be implemented in software that is stored in the memory module 106 and executed by a computer processor that is included in the media device 100. Alternatively, the imaging module 104 may be implemented in firmware or hardware that is included in the media device 100.

The memory module 106 is computer memory, such as a RAM or Flash memory. In one embodiment, the memory module 106 comprises a source image buffer 108 and a destination image buffer 110. The source image buffer 108 and destination image buffer 110 may be defined by software, or alternatively may be associated with a dedicated memory block or memory device.

The source image buffer 108 stores an image to be shown on the display 102. The image may be stored as a two-dimensional array of pixel values. Each pixel value comprises data that specifies the color of a specific portion of the image. The destination image buffer 110 also contains pixel values, and is used in the process of displaying computer animation or transparent images on the media device 100. To display an animation, a series of frames are displayed in rapid succession. Each frame comprises one or more images which are stored in the destination image buffer 110.

To display an image as part of an animation that is shown on the display 102, or to display a transparent image on the display 102, the pixel values from the source image buffer 108 are copied to corresponding pixel values in the destination image buffer 110. If an image to be added to the destination image buffer 110 is at least partially transparent, then the pixel values stored in the source image buffer 108 that represent transparent portions of the image include data specifying the level of transparency of the pixels. Blending techniques, such as alpha blending, then use the transparency data and color data in the pixels in the source image buffer 108 to calculate new pixel values to be stored in the destination image buffer 110. The pixel values then stored in the destination image buffer 110 comprise color values that have been adjusted to produce the effect of transparency.

Figure 2:
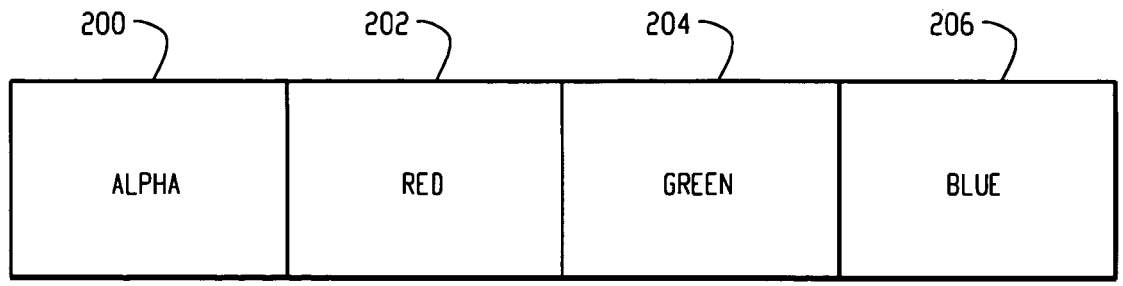
FIG. 2 is a block diagram of a format of a 32-bit pixel representation of image data.

FIG. 2 is a block diagram of a format of a 32-bit pixel representation. The pixel representation comprises eight alpha bits 200, eight red bits 202, eight green bits 204, and eight blue bits 206. The alpha bits 200 specify the degree of transparency of the image section specified by the pixel. The red bits 202, green bits 204 and blue bits 206 specify the red, green and blue components of the color of the section specified by the pixel, respectively.

Known alpha blending techniques use the following formulas to calculate a pixel to be added to the destination image buffer 110 which corresponds to a pixel in the source image buffer 108 which is formatted as described above:

$R0_{new}=(1-A1)*R0+A1*R1$ $G0_{new}=(1-A1)*G0+A1*G1$ $B0_{new}=(1-A1)*B0+A1*B1,$ where $R0_{new}$, $G0_{new}$, $B0_{new}$, are the output colors to be added to the destination image buffer 110, R0, G0, and B0 are the red, green, and blue components of the pixel in the destination image buffer 110; R1, G1, and B1 are the red, green and blue components of the pixel in the source image buffer 108; and A1 is the alpha component of the pixel in the source image buffer 108, normalized between zero and one. Typically, a value of A1=1 represents a fully opaque bit, and a value of A1=0 represents a fully transparent pixel.

The format shown in FIG. 2 is also applicable to other bit resolutions, such as a 16-bit pixel representation. While the 32-bit format is a typical pixel representation, many media devices support only 16-bit formats. Thus, data formatted according to the format shown in FIG. 2 is an example of a representation of a pixel that is stored in a source image buffer 108 in a 16-bit resolution. Because a pixel value to be stored in the destination image buffer 110 is calculated for each pixel of an image in a source image buffer 108, alpha blending techniques that are implemented using the formula described above require many potentially costly multiplication operations on the media device 100.

Figure 3:
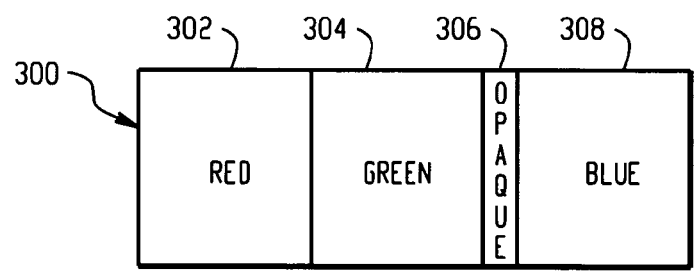
FIGS. 3 and 4 are block diagrams of a dynamic image data structure.
Figure 4:
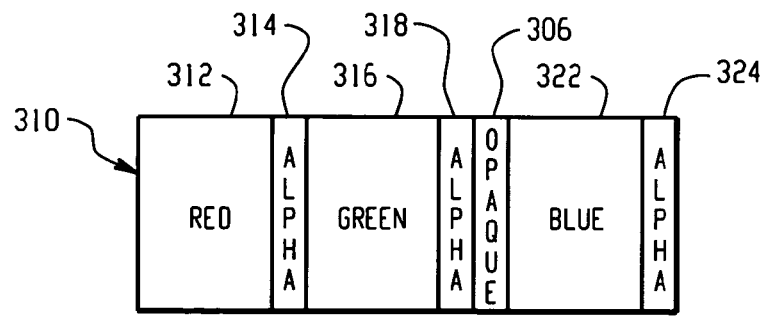

FIGS. 3 and 4 are block diagrams of a dynamic image data structure. As illustrated, the data structure provides a 16-bit pixel representation, and thus may accommodate a number of media devices. Larger pixel representations may also be used, such as a 32-bit pixel representation. These larger pixel representations may be used for media devices 100 that have higher processing capabilities, or even in other processing devices, such as a portable computer or desktop computer.

The dynamic image data structure may be used to store and process alpha pixels and non-alpha pixels. FIG. 3 shows the dynamic image data structure for a non-alpha pixel 300. The non-alpha pixel 300 does not contain data specifying transparency, i.e., the pixel is opaque. Conversely, the alpha pixel 310 of FIG. 4 contains data specifying transparency.

The non-alpha pixel 300 comprises five red bits 302, five green bits 304, an opaque bit 306, and five blue bits 308. The red bits 302, green bits 304, and blue bits 308 are as described above. If the opaque bit 306 is set to "1", then the opaque bit 306 specifies that the pixel is opaque. Thus, the pixel is a non-alpha pixel 300 that does not contain transparency data.

The alpha pixel 310 comprises four red bits 312, a first alpha bit 314, four green bits 316, a second alpha bit 318, the opaque bit 306, four blue bits 322, and a third alpha bit 324. The red bits 312, green bits 316, and blue bits 322 are as described above, except that the bit data has been reduced from five bits to four bits. The fifth bits of the red, green and blue bits 312, 316 and 322 are used for the alpha bits 314, 318, 324, which together specify the transparency level of the pixel value.

If the opaque bit 306 is set to "0," then the opaque bit 306 specifies that the pixel is not opaque. Thus, the pixel is an alpha pixel 310 that contains transparency data. The transparency level specified by the alpha bits 314, 318, 324 is a logarithmic value according to the following table:

| First alpha bit (a2) | Second alpha bit (a1) | Third alpha bit (a0) | Transparency level |
|---|---|---|---|
| 0 | 0 | 0 | 0% |
| 0 | 0 | 1 | 50% |
| 0 | 1 | 0 | 75% |
| 0 | 1 | 1 | 87.5% |
| 1 | 0 | 0 | 100% |
| 1 | 0 | 1 | 50% |
| 1 | 1 | 0 | 25% |
| 1 | 1 | 1 | 12.5% |

The logarithmic values facilitate the use of bit-shifting operations instead of floating-point operations. The bit sequence (a1 a0) is used as a logarithmic scale for transparency values. For example, when (a1 a0) is (01)=1, there is a right shift by 1, which is equivalent to dividing by two (hence the 50% value). Shifting again divides that previous result by two (hence the 75% value) and so on. The a2 bit to "flips" the logarithm to obtain a more balanced transparency scale. Thus, by using three bits, a transparency scale of 0%, 12.5%, 25%, 50%, 75%, 87.5%, 100% can be obtained.

In the embodiment shown in the table above, the transparency level is a value that is inversely proportional to the transparency of the pixel. For example, a transparency level of 0% represents a completely transparent pixel, while a transparency level of 100% represents a completely opaque pixel. Thus, in the embodiment shown in the table above, the numerical value of the transparency level is proportional to the opacity level of the pixel. Other magnitude relations may be used. For example, in another embodiment, a transparency level of 100% may represent a completely transparent pixel, while a transparency level of 0% represents a completely opaque pixel.

Other transparence levels may also be specified, depending on the number of alpha bits used. For example, a 32-bit pixel representation may use seven alpha bits and one opaque bit. The data structure thus dynamically adjusts the length of the bit fields for the red, green and blue bits 312, 316, and 322 to provide the alpha bits 314, 318 and 324 when the opaque bit 306 specifies that the pixel is transparent.

Conversion of the five-bit red, green and blue bits 302, 304, and 308 to the four-bit red, green and blue bits 312, 316, and 322 may be accomplished by dropping off the least significant bit of the red, green and blue bits 302, 304, and 308. Other conversion methods may also be used.

The data structure of FIGS. 3 and 4 may be stored in a computer readable medium on the media device 100, or on some other processing device. For example, the data structure may be stored on a computer in communication with a communication network, such as a server computer connected to the Internet. A mobile device may be operable to communicate with the server via a wireless communication system in communication with the Internet. The data structure may be transmitted to the mobile communication device via a computer data signal over the Internet and over the wireless communication system. Upon receiving the computer data signal, the mobile communication device can store the data structure in a memory store for processing.

Alpha blending is accomplished using two sets of operations. When the first alpha bit 314 is equal to zero, the following operations are performed according to the first set of alpha blending equations:

$$RO_{new}=[R1-(1-A)*R1]+(1-A)*R0 \quad (1-A)$$

$$GO_{new}=[G1-(1-A)*G1]+(1-A)*G0 \quad (2-A)$$

$$BO_{new}=[B1-(1-A)*B1]+(1-A)*B0, \quad (3-A)$$

When the first alpha bit 314 is equal to one, the following operations are performed according to the second sent of alpha blending equations:

$$RO_{new}=[R0-A*R0]+A*R1 \quad (1-B)$$

$$GO_{new}=[G0-A*G0]+A*G1 \quad (2-B)$$

$$BO_{new}=[B0-A*B0]+A*B1, \quad (3-B)$$

In both sets of equations, $RO_{new}$, $GO_{new}$, and $BO_{new}$ are the red, green, and blue components of the pixel to be added to the destination image buffer 110; R0, G0, and B0 are the red, green, and blue components of the pixel in the destination image buffer 110; R1, G1, and B1 are the red, green and blue components of the pixel in the source image buffer 108 as specified by the red bits 312, green bits 316, and blue bits 322, and A is a representation of the alpha component of the pixel in the source image buffer 108, as specified by the alpha bits 314, 318, 324.

The first set of alpha blending equations 1-A, 2-A and 3-A are mathematically the same as the second set of equations 1-B, 2-B and 3-B, respectively. However, each set of equations specifies an order of operations to be performed on a computer processing device. Thus, the actual operations used to perform the processing of the first set of alpha blending equations 1-A, 2-A and 3-A differs from the actual operations used to perform the processing of the second set of alpha blending equations 1-B, 2-B and 3-B.

Figure 5:
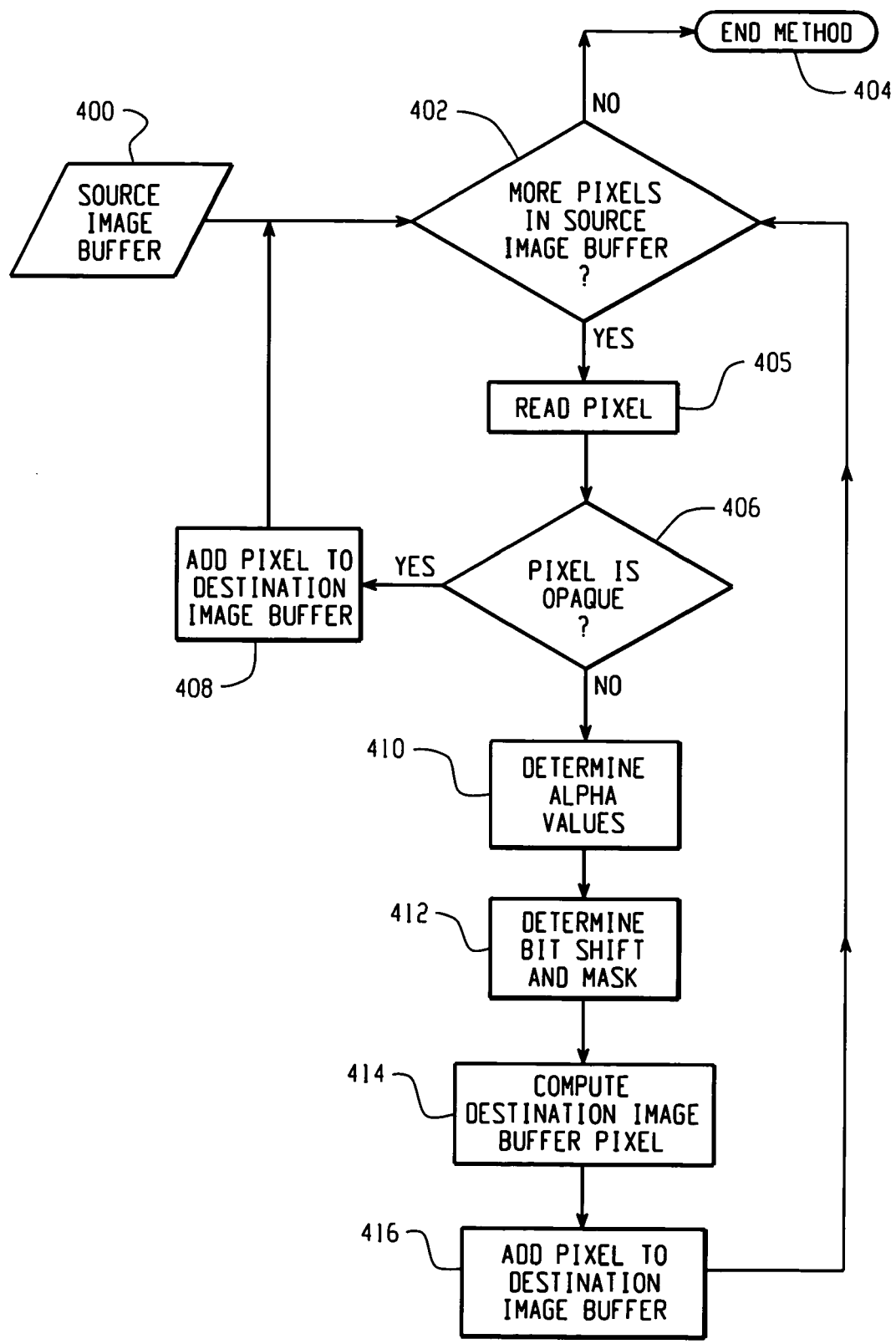
FIG. 5 is a flowchart illustrating a method of alpha blending.

The alpha blending operations above allow the multiplication operations to be replaced with more efficient bit shift and bit masking operations, which are illustrated in FIG. 5. The grouping of the equations illustrate an order of operations that avoids carry-over between bit fields and allows the operations to be performed in-place in the memory store. By using shifting and masking operations, the values for the color components in the pixels can be manipulated in the memory in which the pixels are stored without having to copy the values to another memory location to perform the operations.

The data structures of FIGS. 3 and 4 and associated alpha blending equations facilitate pixel representation according to the 16-bit constraint of many media devices. Transparency may be specified without requiring additional storage, such as alpha channels. The pixel format also approximates a 5-6-5 pixel format of five red bits followed by 6 green bits followed by 5 blue bits. The 5-6-5 approximation minimizes the amount of error should a pixel using the format described in FIG. 4 be interpreted as a pixel using the 5-6-5 format, as the transparency data is placed in the least significant bit locations in the 5-6-5 format. Thus, if a mobile device not programmed to render the approximated 5-6-5 image data receives such data, then the mobile device may render the data with minimum error.

In a traditional 5-6-5 implementation, which is used in the non-alpha pixel 300, five bits are used to represent the data values of the red, green and blue bits 302, 304 and 308. The red and blue levels range from 0-31 in steps of 1, and the green levels range from 0-62 in steps of 2. In the approximated 5-6-5 implementation for the alpha pixel 310, four bits are used to represent the data values of the red, green and blue bits 312, 316 and 322. The red and blue levels range from 0-30 in steps of 2, and the green level ranges from 0-60 in steps of 4. Additionally, while the data structure of FIG. 4 has been described as an approximated 5-6-5 format, it can be used to approximate other formats, such as a 6-5-5 or a 5-5-6 format.

Furthermore, the actual location of the alpha bits and the transparency bit may be located in locations other than the least significant bit locations. For example, the alpha bits and the transparency bit could be located in the first four bit locations of the data structure. However, this example implementation may not minimize errors in devices not programmed to render the approximated data structure.

FIG. 5 is a flowchart illustrating a method of alpha blending. A source image buffer 400 stores pixels represented by the data structure format of FIGS. 3 and 4. The pixels are alpha-blended and added to a destination image buffer.

Step 402 determines whether there are additional pixels to process in the source image buffer 400. If there are no additional pixels to process, then the method ends at step 404.

If step 402 determines that there are additional pixels to process, step 405 reads a pixel from the source image buffer 400, and step 406 determines whether the pixel read at step 405 is opaque.

The pixel is opaque if the opaque bit 306 has a value of one, and the pixel is not opaque if the opaque bit 306 has a value of zero. If it is determined at step 406 that the pixel is opaque, then step 408 writes the pixel data to the destination image buffer without alpha blending, and step 402 is then repeated.

If step 406 determines that the pixel is not opaque, then alpha blending is performed on the pixel starting at step 410, which determines the alpha values specified by the alpha bits 314, 318, 324. In one embodiment, the values of the three alpha bits 314, 318, 324 are determined according to the following pseudocode:

```
if (P1 & 0x0800) {
    a2 = 1;
} else {
    a2 = 0;
}
if (P1 & 0x0040) {
    a1 = 1;
} else {
    a1 = 0;
}
if (P1 & 0x0001) {
    a0 = 1;
} else {
    a0 = 0;
},
``` where P1 is the pixel in the source image buffer 400 to be processed, and a2, a1, and a0 are the first alpha bit 314, the second alpha bit 318, and the third alpha bit 324, respectively. The "&" operator denotes a bitwise AND operation. Other methods or processes of determining the three alpha bits a0, a1 and a2 may also be used.

Step 412 then determines a bit shift and a bit mask required to perform the alpha blending. In one embodiment, the bit shift "n" and bit mask "mask" are determined according to the following pseudocode:

```
n = (a1 << 1) + a0;
switch (n) {
    case 0:
        mask = ~0;
        break;
    case 1:
        mask = ~0x0410;
        break;
    case 2:
        mask = ~0x0618;
        break;
    case 3:
        mask = ~0x071C;
        break;
}
```

The "<<" operator denotes a bitwise left shit, and the "~" operate denotes a bitwise 1's compliment. The multiplications in the first and second sets of alpha blending equations above are replaced with right shifts of n=2a1+a0 bits, followed by bit masking with the corresponding masks to eliminate carry-over between fields. The mask values 0, 0x410, 0x0618 and 0x071C correspond to carry-overs for a O-bit shift, a 1-bit shift, a 2-bit shift, and a 3-bit shift, respectively.

Other methods of determining the bit shifts and masks may also be used. For example, an indexed array of the four mask values of 0, 0x410, 0x0618 and 0x071C indexed by the bit shifted value of a1 added to a0 may be used. Thus, the three resulting indexed values of 0, 1, 2 and 3 would index the mask values of 0, 0x410, 0x0618 and 0x071C, respectively.

Step 414 computes the pixel value to be added to the destination image buffer. The destination image buffer pixel is computed according to the following pseudocode:

```
if (a2 == 0) {
    Q0 = P1;
    Q1 = P0;
} else {
    Q0 = P0;
    Q1 = P1;
}
P0 := Q0 - ((Q0 >>> n) & mask);
P0 += (Q1 >>> n) & mask;
``` where P0 is the destination image buffer pixel, P1 is the current pixel value stored in the source image buffer, and Q0 and Q1 are calculation variables. The ">>>" operator denotes an unsigned bitwise right shift.

Step 416 then writes the pixel data that was computed at step 414 to the destination image buffer. Step 402 is then repeated.

The alpha blending method of FIG. 5 performs alpha blending of 16-bit pixel values without performing any multiplication operations. Multiplication is a potentially costly operation, especially in the absence of an arithmetic co-processor. Thus, the method of FIG. 5 is particularly useful for devices having limited processing capabilities.

Figure 6:
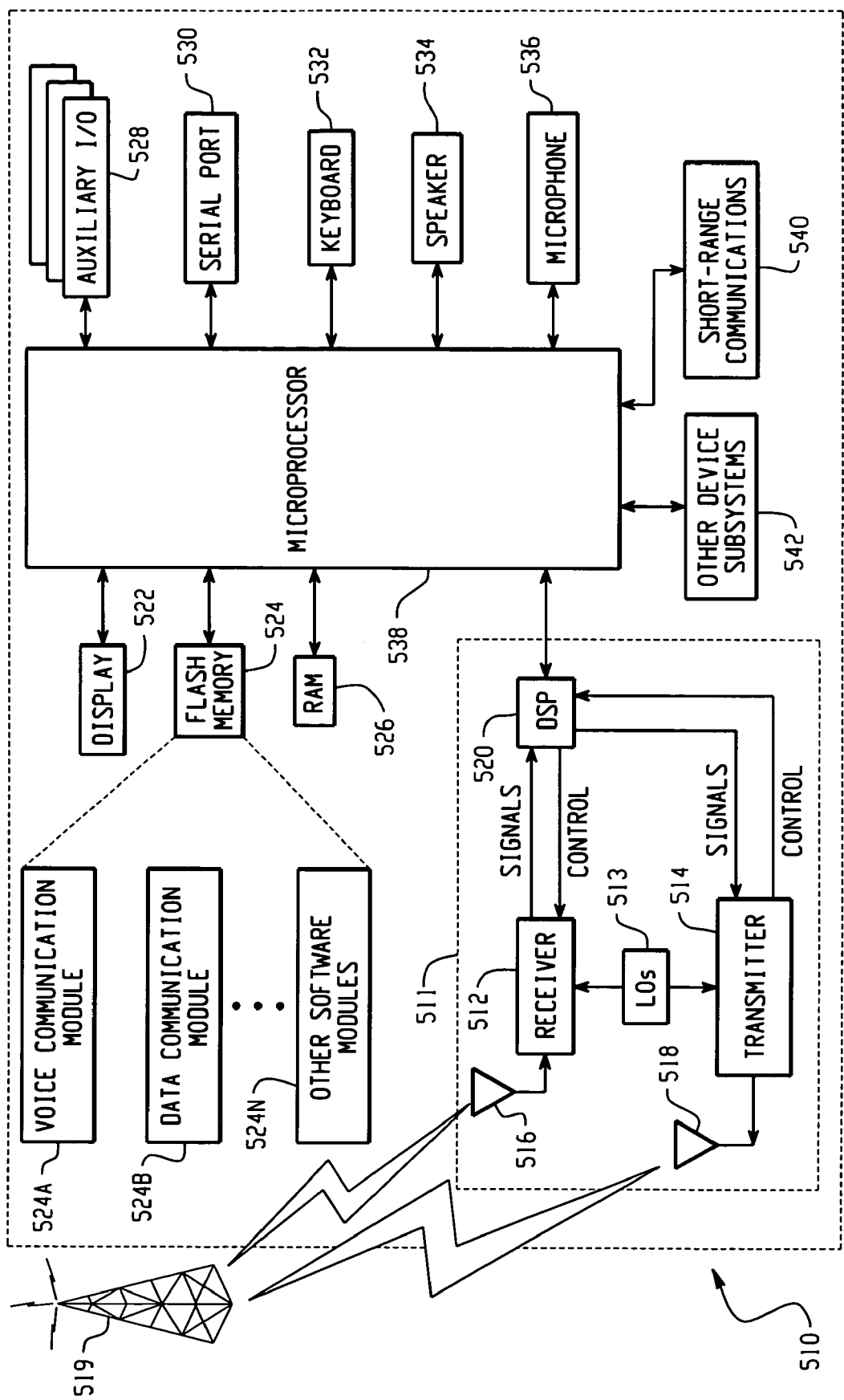
FIG. 6 is a block diagram of an exemplary mobile communication device that may incorporate the systems and methods described herein

FIG. 6 is a block diagram of an exemplary mobile communication device that may incorporate the display processing system and method described above. The mobile communication device 510 includes a transceiver 511, a microprocessor 538, a display 522, Flash memory 524, RAM memory 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver 512, a transmitter 514, one or more local oscillators 513, and a digital signal processor 520. Within the Flash memory 524, the mobile communication device 510 preferably includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile communication device 510 is preferably a two-way communication device having voice and data communication capabilities. Thus, for example, the mobile communication device 510 may communicate over a voice network, such as any of the analog or digital cellular networks, and may also communicate over a data network. The voice and data networks are depicted in FIG. 6 by the communication tower 519. These voice and data networks may be separate communication networks using separate infrastructure, such as base stations, network controllers, etc., or they may be integrated into a single wireless network.

The communication subsystem 511 is used to communicate with the voice and data network 519, and includes the receiver 512, the transmitter 514, the one or more local oscillators 513 and may also include the DSP 520. The DSP 520 is used to send and receive signals to and from the transmitter 514 and receiver 512, and is also utilized to receive control information from the transmitter 514 and to provide control information to the receiver 512. If the voice and data communications occur at a single frequency, or closely-spaced set of frequencies, then a single local oscillator 513 may be used in conjunction with the transmitter 514 and receiver 512. Alternatively, if different frequencies are utilized for voice communications versus data communications, then a plurality of local oscillators 513 can be used to generate a plurality of frequencies corresponding to the voice and data networks 519. Although two antennas 516, 518 are shown, the mobile communication device 510 could be used with a single antenna structure. Information, which includes both voice and data information, is communicated to and from the communication module 511 via a link between the DSP 520 and the microprocessor 538. The detailed design of the communication subsystem 511, such as frequency band, component selection, power level, etc., is dependent upon the communication network 519 in which the mobile communication device 510 is intended to operate. Depending upon the type of network or networks 519, the access requirements for the mobile communication device 510 may also vary. For example, in the Mobitex and DataTAC data networks, media devices are registered on the network using a unique identification number associated with each device. In GPRS data networks, however, network access is associated with a subscriber or user of a media device. A GPRS device typically requires a subscriber identity module ("SIM"), which is required to operate a mobile communication device on a GPRS network. Local or non-network communication functions (if any) may be operable, without the SIM, but a mobile communication device will be unable to carry out any functions involving communications over the data network 519, other than any legally required operations, such as 911 emergency calling.

After any required network registration or activation procedures have been completed, the mobile communication device 510 may then send and receive communication signals, including both voice and data signals, over the network 519 (or networks). Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 (or networks) via the antenna 518. Although a single transceiver 511 is shown for both voice and data communications, it is possible that the mobile communication device 510 may include two distinct transceivers, a first transceiver for transmitting and receiving voice signals, and a second transceiver for transmitting and receiving data signals.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 to provide more sophisticated control of the transceiver 511.

The microprocessor 538 preferably manages and controls the overall operation of the mobile communication device 510. Many types of microprocessors or micro controllers could be used here, or, alternatively, a single DSP 520 could be used to carry out the functions of the microprocessor 538. Low-level communication functions, including at least data and voice communications, are performed through the DSP 520 in the transceiver 511. Other, high-level communication applications, such as a voice communication application 524A, and a data communication application 524B may be stored in the Flash memory 524 for execution by the microprocessor 538. For example, the voice communication module 524A may provide a high-level user interface operable to transmit and receive voice calls between the mobile communication device 510 and a plurality of other voice devices via the network 519. Similarly, the data communication module 524B may provide a high-level user interface operable for sending and receiving data, such as e-mail messages, files, organizer information, short text messages, etc., between the mobile communication device 510 and a plurality of other data devices via the network 519. In the mobile communication device 510, a system or method of displaying transparent images may also be implemented as a software module or application, or incorporated into one of the software modules 524A-524N.

The microprocessor 538 also interacts with other mobile communication device subsystems, such as the display 522, Flash memory 524, random access memory (RAM) 526, auxiliary input/output (I/O) subsystems 528, serial port 530, keyboard 532, speaker 534, microphone 536, a short-range communications subsystem 540 and any other mobile communication device subsystems generally designated as 542.

Some of the subsystems shown in FIG. 6 perform communication-related functions, whereas other subsystems may provide resident or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as Flash memory 524. In addition to the operating system, which controls all of the low-level functions of the mobile communication device 510, the Flash memory 524 may include a plurality of high-level software application programs, or modules, such as a voice communication module 524A, a data communication module 524B, an organizer module (not shown), or any other type of software module 524N. The Flash memory 524 also may include a file system for storing data. These modules are executed by the microprocessor 538 and provide a high-level interface between a user of the mobile communication device and the media device. This interface typically includes a graphical component provided through the display 522, and an input/output component provided through the auxiliary I/O 528, keyboard 532, speaker 534, and microphone 536. The operating system, specific mobile communication device software applications or modules, or parts thereof, may be temporarily loaded into a volatile store, such as RAM 526 for faster operation. Moreover, received communication signals may also be temporarily stored to RAM 526, before permanently writing them to a file system located in the persistent store 524.

An exemplary application module 524N that may be loaded onto the mobile communication device 510 is a personal information manager (PIM) application providing PDA functionality, such as calendar events, appointments, and task items. This module 524N may also interact with the voice communication module 524A for managing phone calls, voice mails, etc., and may also interact with the data communication module for managing e-mail communications and other data transmissions. Alternatively, all of the functionality of the voice communication module 524A and the data communication module 524B may be integrated into the PIM module.

The Flash memory 524 preferably provides a file system to facilitate storage of PIM data items on the mobile communication device 510. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user. The Flash memory 524 may be used, for example, to store the source image buffer 108 and destination image buffer 110 of FIG. 1.

The mobile communication device 510 may also be manually synchronized with a host system by placing the mobile communication device 510 in an interface cradle, which couples the serial port 530 of the mobile communication device 510 to the serial port of the host system. The serial port 530 may also be used to enable a user to set preferences through an external device or software application, or to download other application modules 524N for installation. This wired download path may be used to load an encryption key onto the mobile communication device 510, which is a more secure method than exchanging encryption information via the wireless network 519.

Additional application modules 524N may be loaded onto the mobile communication device 510 through the network 519, through an auxiliary I/O subsystem 528, through the serial port 530, through the short-range communications subsystem 540, or through any other suitable subsystem 542, and installed by a user in the Flash memory 524 or RAM 526. Such flexibility in application installation increases the functionality of the mobile communication device 510 and may provide enhanced on-device functions, communication-related functions, or both. For example, secure communication applications may enable electronic commerce functions and other such financial transactions to be performed using the mobile communication device 510.

When the device 510 is operating in a data communication mode, a received signal, such as a text message or a web page download, will be processed by the transceiver 511 and provided to the microprocessor 538, which will preferably further process the received signal for output to the display 522, or, alternatively, to an auxiliary I/O device 528. A user of the mobile communication device 510 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile communication device 510 is further enhanced with a plurality of auxiliary I/O devices 528, which may include a thumbwheel input device, a touchpad, a variety of switches, a rocker input switch, etc. The composed data items input by the user may then be transmitted over the communication network 519 via the transceiver 511.

When the mobile communication device 510 is operating in a voice communication mode, the overall operation of the mobile communication device 510 is substantially similar to the data mode, except that received signals are preferably be output to the speaker 534 and voice signals for transmission are generated by a microphone 536. Alternative voice or audio I/O subsystems, such as a voice message recording subsystem, may also be implemented on the mobile communication device 510. Although voice or audio signal output is preferably accomplished primarily through the speaker 534, the display 522 may also be used to provide an indication of the identity of a calling party, the duration of a voice call, or other voice call related information. For example, the microprocessor 538, in conjunction with the voice communication module and the operating system software, may detect the caller identification information of an incoming voice call and display it on the display 522.

A short-range communications subsystem 540 is also included in the mobile communication device 510. For example, the short-range communications subsystem 540 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and 802.11 refer to sets of specifications, available from the Institute of Electrical and Electronics Engineers (IEEE), relating to wireless personal area networks and wireless LANs, respectively.

While the display processing system and method has been described with reference to a mobile device, the display processing system and method can be used to display any transparent image on any display processing device or computer. For example, a video processing card for a desktop PC device may incorporate the display processing system and method described above. Additionally, the image need not be part of an animation; the display process method may be used to render any video image on a computing device.

This written description uses illustrative embodiments to disclose the invention, including the best mode, and also to enable a person of ordinary skill in the art to make and use the invention. Other embodiments and devices are within the scope of the claims if they have elements that do not differ from the literal language of the claims or have elements equivalent to those recited in the claims.

What is claimed is:

1. A computer readable medium encoded with an image data structure for facilitating the rendering of an image by an image processing device, comprising:
   a first data field operable to store opaque data, the opaque data indicating whether image data is transparent or opaque; and
   a red pixel data field associated with the first data field, the red pixel data field operable to store first red pixel data when the opaque data indicates an image is opaque, and operable to store second red pixel data and first transparency data when the opaque data indicates that the image is transparent;
   a green pixel data field associated with the first data field, the green pixel data field operable to store first green pixel data when the opaque data indicates an image is opaque, and operable to store second green pixel data and second transparency data when the opaque data indicates that the image is transparent; and
   a blue pixel data field associated with the first data field, the blue pixel data field operable to store first blue pixel data when the opaque data indicates an image is opaque, and operable to store second blue pixel data and third transparency data when the opaque data indicates that the image is transparent, wherein the first, second and third transparency data specify a transparency level of a pixel defined by the second red, green and blue pixel data.

2. The computer readable medium of claim 1, wherein the one or more pixel data fields comprise an approximated 5-6-5 pixel format when the opaque data indicates that the pixel data is transparent.

3. The computer readable medium of claim 1, wherein the transparency level defined by the first, second and third transparency data comprise first, second and third bits, respectively, the first bit for selecting one of a plurality of transparency operations for rendering an image and the second and third bits defining bit shifting and masking operands for the selected transparency operation.

4. The computer readable medium of claim 1, wherein the first, second and third bits define transparency levels according to a logarithmic increment.

5. A computer implemented method of processing image pixel data corresponding to an image pixel, comprising:
   step for determining if the image pixel is opaque or transparent;
   step for determined to be opaque, then determining a pixel color value from a first set of the image pixel data if the image pixel is determined to be opaque;
   step for determining a transparency value from a second set of the image pixel data; and for
   determining a pixel color value from a third set of the image pixel data if the image pixel data is determined to be transparent
   wherein the second and third sets of the image pixel data occupy the same data bits as the first set of image pixel data.

6. The method of claim 5, further comprising:
   storing the image pixel data in a first memory store;
   storing displayed image pixel data in a second memory store;
   if the image pixel is determined to be transparent, then:
   determining a bit shift value based on the transparency value; and
   performing a bit shift of the bit shift value on the image pixel data stored in the first memory store and displayed image pixel data in the second memory store to determine a new displayed image pixel data.

7. The method of claim 6, wherein the step for performing a bit shift of the bit shift value on the image pixel data stored in the first memory store and displayed image pixel data in the second memory store to determine the new displayed image pixel data comprises:
selecting a first set of shifting operations if the transparency value corresponds to a first characteristic; and
selecting a second set of shifting operations if the transparency value corresponds to a second characteristic.

8. The method of claim 5, wherein the transparency value is one of a plurality of logarithmic transparency values.

9. A mobile communication device including an image processing device, the image processing device operable to process image pixel data corresponding to an image pixel and comprising:
means for determining if the image pixel is opaque or transparent;
means for determining a pixel color value from a first set of image pixel data when the image pixel is determined to be opaque; and
means for determining a transparency value from a second set of the image pixel data and for determining a pixel color value from a third set of the image pixel data if the image pixel data is determined to be transparent, wherein the second and third sets of the image pixel data occupy the same data bits as the first set of image pixel data.

10. The mobile device of claim 9, wherein the means for determining if the image pixel is opaque or transparent comprises a first data field stored in a computer readable medium in the mobile device and operable to store opaque data, the opaque data indicating whether image data is transparent or opaque.

11. The mobile device of claim 9, wherein the means for determining a pixel color value and the means for determining a transparency value comprise one or more pixel data fields associated with the first data field and stored in a computer readable medium in the mobile device, the one or more pixel data fields operable to store first pixel data in each pixel data field when the opaque data indicates an image is opaque, and operable to store second pixel data and transparency data in each pixel data field when the opaque data indicates that the image is transparent.

12. A mobile communication device, comprising:
a display device;
a memory module comprising a source image buffer and a destination image buffer, the source image buffer operable to store first image data to be displayed on the display device, and the destination image buffer operable to store second image data to be displayed on the display device, the second image data comprising: a first data field operable to store opaque data, the opaque data indicating whether second image data is transparent or opaque,
a red pixel data field associated with the first data field, the red pixel data field operable to store first red dixel data when the opaque data indicates an image is opaque. and operable to store second red pixel data and first transparency data when the opaque data indicates that the image is transparent;
A green pixel data field associated with the first data field, the green pixel data field operable to store first green pixel data when the opaque data indicates an image is opaque, and operable to store second green pixel data and second transparency data when the opaque data indicates that the image is transparent; and
A blue pixel data field associated with the first data field, the blue pixel data field operable to store first blue pixel data when the opaque data indicates an image is opaque. and operable to store second blue pixel data and third transparency data when the opaque data indicates that the image is transparent, wherein the first, second and third transparency data specify a transparency level of a pixel defined by the second red, green and blue pixel data.

13. The mobile communication device of claim 12, further comprising an imaging module operable to determine if the second image data is opaque or transparent based on the opaque data, to determine a pixel color value from the first pixel color data if the image is determined to be opaque, and to determine the pixel color value from the second pixel color data and to determine a transparency level from the transparency data if the image is determined to be transparent.

14. The mobile communication device of claim 12, wherein the second pixel color data comprise an approximated 5-6-5 pixel format when the opaque data indicates that the pixel data is transparent.

15. The mobile communication device of claim 14, wherein the opaque data comprises first, second and third transparency data bits that collectively define a transparency level.

16. The mobile communication device of claim 15, wherein the first bit corresponds to a selection from one of a plurality of transparency operations for rendering an image and the second and third bits defining bit shifting and masking operands for the selected transparency operation.

17. The mobile communication device of claim 12, wherein the transparency data defines one of a plurality of logarithmic transparency values.

* * * * *

UNITED STATES PATENT AND TRADEMARK OFFICE
CERTIFICATE OF CORRECTION

PATENT NO. : 7,466,855 B2
APPLICATION NO. : 10/776824
DATED : December 16, 2008
INVENTOR(S) : Steele et al.

It is certified that error appears in the above-identified patent and that said Letters Patent is hereby corrected as shown below:

Column 12, line 48, please replace "step for determined to be opaque, then determining" to -- step for determining --

Column 12, line 50, please replace "opaque;" with -- opaque; and --

Column 12, line 55, please replace "transparent" with -- transparent; --

Column 14, line 7, please replace "red dixel" with -- red pixel --

Column 14, line 8, please replace "opaque. and" with -- opaque, and --

Column 14, lines 20-21, please replace "opaque. and" with -- opaque, and --

Signed and Sealed this

Twenty-seventh Day of October, 2009

David J. Kappos
*Director of the United States Patent and Trademark Office*